UNITED STATES PATENT OFFICE.

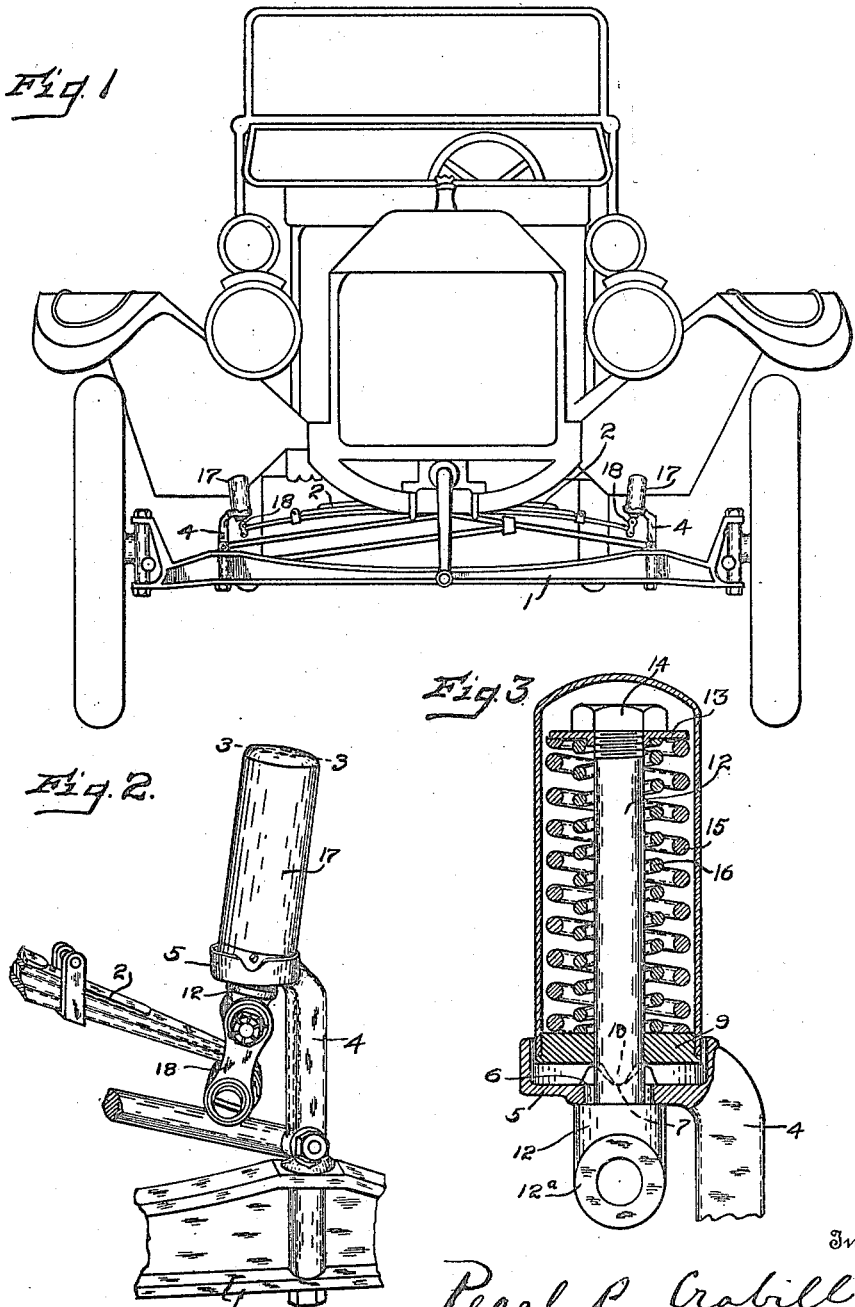

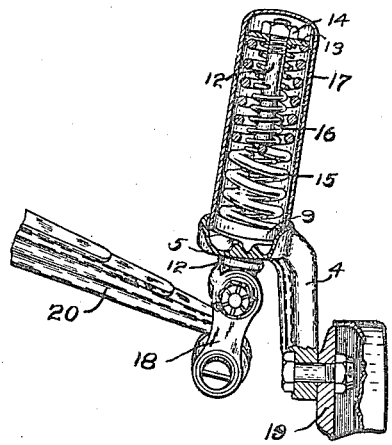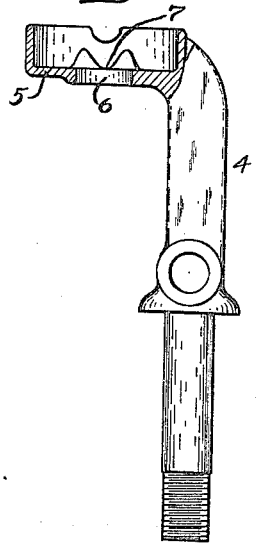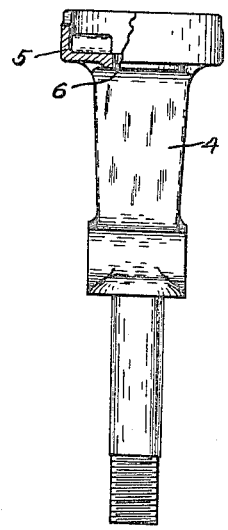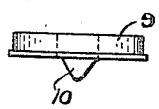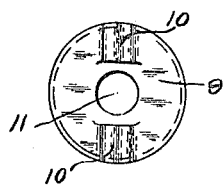

PEARL P. CRABILL AND JAMES TURNER, OF SPRINGFIELD, OHIO, ASSIGNORS TO THE CENTRAL BRASS & FIXTURE COMPANY, OF SPRINGFIELD, OHIO, A CORPORATION OF OHIO.

SHOCK-ABSORBER.

1,232,659. Specification of Letters Patent. Patented July 10, 1917.

Application filed July 8, 1914. Serial No. 849,714.

*To all whom it may concern:*

Be it known that we, PEARL P. CRABILL and JAMES TURNER, citizens of the United States, residing at Springfield, in the county of Clark, and State of Ohio, have invented certain new and useful Improvements in Shock-Absorbers, of which the following is a specification.

Our invention relates to improvements in shock absorbers for vehicles, and it more particularly relates to devices of the character used in connection with transversely arranged leaf springs such as are used on motor vehicles of the Ford type.

The object of the invention is to provide a shock absorber which will maintain proper alinement with the main vehicle springs so as to obviate friction.

A further object of the invention is to simplify and make more effective the operation of devices of this character.

In the accompanying drawings—

Figure 1 is a front elevation of a motor vehicle showing our improved devices applied thereto.

Fig. 2 is a view in perspective of a portion of the front axle and the front leaf spring showing the manner of applying our improvement thereto.

Fig. 3 is a vertical sectional view, the section being on the line 3—3 of Fig. 2.

Fig. 4 is a view of a portion of the rear axle flange and rear leaf spring showing the manner of applying our improvement thereto, a portion of the parts being shown in section.

Fig. 5 is a front view partly in section of the supporting post.

Fig. 6 is a side view of the same, partly in section.

Fig. 7 is a side view of the rocker plate.

Fig. 8 is a bottom plan view of the same.

Like parts are represented by similar characters of reference in the several views.

In said drawings, 1 represents the front axle of a motor vehicle and 2 the front leaf spring which in the present case is transversely arranged with respect to the vehicle body, the body and spring being connected in the usual way.

One of our improved shock absorbers is arranged at each end of the transverse spring, but as they are identical in construction but one will be described.

Secured to the axle 1 and projecting upwardly therefrom is a post 4, the upper end of which has a lateral cup-shaped projection, 5, integrally formed therewith. This cup-shaped projection 5 has a central opening 6 and is also provided at the front and rear of said opening with V-shaped grooves 7. Seated in this cup-shaped projection is a rocker plate 9, the under side of the rocker plate being provided with V-shaped projections 10 which are received in the grooves 7 to form in effect bearings of the knife-edge type so that the plate may have a rocking motion in said cup in the direction of the elongation or contraction of the main leaf spring only.

Projecting upwardly through the opening 6 and also through an opening 11 in the rocker plate is a rod 12 which is provided at its upper screwthreaded end with a washer 13 and nut 14. Interposed between the washer 13 and the rocker plate 9 are coil springs 15 and 16 of different strengths; these springs being preferably inclosed by a casing 17, the lower end of which is fitted to the rocker plate 9 in a manner to permit its ready removal. The lower end of the rod 12 is enlarged as indicated at $12^a$ so as to contact the under surface of the projection 5 and form a stop to limit its upward movement. A clip 18 pivotally connected to the lower end $12^a$ of the rod and also to the end of the spring 2 serves to pivotally connect the rod and spring together.

In Fig. 4 is illustrated the manner of connecting the device to the rear axle, in which case the post 4 is bolted to the rear axle flange 19 and is connected to the rear transverse leaf spring 20 in the same manner as explained in connection with the front spring. The rod 12 snugly fits the opening 11 in the rocker plate 9 so that the said plate will form a guide therefor in its up and down movement as it follows the movement of the vehicle body and transverse spring. The opening 6 in the cup-shaped support 5, however, is considerably larger than the diameter of the rod 12 so as to permit the plate 9, the rod and the springs to have a rocking movement relative thereto so as to compensate for the movement of the body and consequent elongation and contraction of the transverse springs.

By this construction it will be seen that the coil spring, sliding rod and rocking plate with rock only in the direction in which the leaf spring elongates and contracts, that is, in a sidewise direction, and will be prevented from swinging in any other direction. It will also be seen that the guide for the rod 12, which is the rocker plate 9, will thus adjust itself to the sidewise swinging movement of the rod due to the elongation of the leaf spring so as to obviate any undue friction between the parts. It will also be seen that the strain upon the rod 12 by the weight of the vehicle body will be kept in a direction parallel to the longitudinal axis of the rod, the rod and its slide adjusting itself to maintain this condition, so that the strain between the rod and its guide is obviated.

Having thus described our invention, we claim:

1. The combination of a support having a laterally extending cup-shaped perforated projection, a plate mounted on said cup-shaped projection, one of said parts having rounded bearings and the other part having grooves to receive said bearings, a coil spring supported on said plate, a rod slidably mounted in said plate and projections and supported by said spring, the lower end of said rod being provided with a shoulder to engage the under side of said projection, a leaf spring, and a link pivotally connecting the end of said leaf spring and the lower end of said rod.

2. The combination, with an axle, of an upwardly extended support having a lateral extending cup-shaped perforated projection, a plate mounted in said cup-shaped projection, a coiled spring supported on said plate, a rod slidably mounted in said plate and supported by said spring the lower end of said rod being extended through the perforation in said projection and provided with a shoulder to engage the underside of said projection, a transversely arranged leaf spring, and a link pivotally connecting the end of said leaf spring and the lower end of said rod, said plate and cup-shaped projection having bearings such as to permit a rocking movement of said plate relatively to said projection, in the direction of elongation and contraction of said leaf spring only.

In testimony whereof, we have hereunto set our hands this 2nd day of July 1914.

PEARL P. CRABILL.
JAMES TURNER.

Witnesses:
CHAS. I. WELCH,
EFFA M. SMITH.

Copies of this patent may be obtained for five cents each, by addressing the "Commissioner of Patents, Washington, D. C."